(12) United States Patent
Wäller et al.

(10) Patent No.: US 9,103,691 B2
(45) Date of Patent: Aug. 11, 2015

(54) MULTIMODE USER INTERFACE OF A DRIVER ASSISTANCE SYSTEM FOR INPUTTING AND PRESENTATION OF INFORMATION

(75) Inventors: Christoph Wäller, Braunschweig (DE); Moritz Neugebauer, Berlin (DE); Thomas Fabian, Hildesheim (DE); Ulrike Wehling, Braunschweig (DE); Günter Horna, Ingolstadt (DE); Markus Missall, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 1249 days.

(21) Appl. No.: 12/741,491

(22) PCT Filed: Nov. 12, 2008

(86) PCT No.: PCT/EP2008/009535
§ 371 (c)(1),
(2), (4) Date: Oct. 4, 2010

(87) PCT Pub. No.: WO2009/062677
PCT Pub. Date: May 22, 2009

(65) Prior Publication Data
US 2011/0022393 A1  Jan. 27, 2011

(30) Foreign Application Priority Data

| Nov. 12, 2007 | (DE) | 10 2007 053 779 |
| Oct. 15, 2008 | (DE) | 10 2008 051 756 |
| Oct. 15, 2008 | (DE) | 10 2008 051 757 |

(51) Int. Cl.
*G10L 15/00* (2013.01)
*G10L 15/28* (2013.01)
(Continued)

(52) U.S. Cl.
CPC ........ *G01C 21/3664* (2013.01); *G01C 21/3608* (2013.01); *G06F 3/038* (2013.01); *G06F 3/044* (2013.01); *G06F 3/0488* (2013.01); *G10L 15/22* (2013.01); *G06F 2203/0381* (2013.01)

(58) Field of Classification Search
CPC ............... G01C 21/36; G01C 21/3608; G01C 21/3664; G06F 3/017
USPC ............... 704/236, 250, 255, 270, 270.1, 275
See application file for complete search history.

(56) References Cited

U.S. PATENT DOCUMENTS

| 5,857,172 A * | 1/1999 | Rozak ........................... 704/275 |
| 6,243,683 B1 * | 6/2001 | Peters ........................... 704/273 |

(Continued)

FOREIGN PATENT DOCUMENTS

| DE | 19715325 A1 | 10/1998 | ............... G06F 3/033 |
| DE | 102005042694 A1 | 7/2006 | ............... G01C 21/26 |

(Continued)

OTHER PUBLICATIONS

Specification of U.S. Appl. No. 60/995,493, filed Sep. 26, 2007 (Non-English).*

(Continued)

*Primary Examiner* — Eric Yen
(74) *Attorney, Agent, or Firm* — Slayden Grubert Beard PLLC (57) ABSTRACT

In a method for multimode information input and/or adaptation of the display of a display and control device, input signals of different modality are detected which are supplied via the device to a voice recognition unit, thus initiating a desired function and/or display as an output signal, which are displayed on the device and/or output by voice output. Touch and/or gesture input signals are provided on or to the device for selection of an object intended for interaction and activation of the voice recognition unit and for the vocabulary which is provided for interaction to be restricted with the selection of the object and/or activation of the voice recognition unit as a function of the selected object, on the basis of which a voice command from the restricted vocabulary is added to the selected object as an information input and/or for adaptation of the display, via the voice recognition unit.

11 Claims, 7 Drawing Sheets

| Input Detection<br>Input Detection<br>M1, M2, M3 | Controlling hand not detectable | Presence of a controlling hand in the range d > 5cm detectable | Presence and position of a controlling hand detectable in the range d > 5cm |
|---|---|---|---|
| | No control intention of the user | General control intention | Potential position of current control target defined |
| Presentation Module<br>Presentation Manager<br>(Procedures) | Display mode: Optimizes entire presentation for information display | Control mode 1: Optimizes entire presentation for manual control | Control mode 2: Optimizes areas aimed at for manual control |

(51) Int. Cl.

| | | |
|---|---|---|
| *G10L 17/00* | (2013.01) | |
| *G10L 21/00* | (2013.01) | |
| *G10L 25/00* | (2013.01) | |
| *G10L 21/06* | (2013.01) | |
| *G01C 21/36* | (2006.01) | |
| *G06F 3/038* | (2013.01) | |
| *G06F 3/044* | (2006.01) | |
| *G06F 3/0488* | (2013.01) | |
| *G10L 15/22* | (2006.01) | |

(56) References Cited

U.S. PATENT DOCUMENTS

| | | | | |
|---|---|---|---|---|
| 6,804,396 | B2* | 10/2004 | Higaki et al. | 382/181 |
| 7,505,908 | B2* | 3/2009 | Johnston et al. | 704/275 |
| 8,370,147 | B2* | 2/2013 | Kennewick et al. | 704/257 |
| 8,655,416 | B2* | 2/2014 | Kulas | 455/566 |
| 8,744,645 | B1* | 6/2014 | Vaghefinazari et al. | 701/1 |
| 2002/0093539 | A1* | 7/2002 | Os et al. | 345/810 |
| 2002/0181773 | A1* | 12/2002 | Higaki et al. | 382/190 |
| 2003/0078784 | A1* | 4/2003 | Jordan et al. | 704/275 |
| 2004/0034455 | A1* | 2/2004 | Simonds et al. | 701/1 |
| 2004/0107045 | A1* | 6/2004 | Kynast et al. | 701/202 |
| 2004/0225504 | A1* | 11/2004 | Junqua et al. | 704/275 |
| 2005/0137877 | A1* | 6/2005 | Oesterling et al. | 704/275 |
| 2005/0192810 | A1* | 9/2005 | Konig | 704/275 |
| 2005/0196784 | A1 | 9/2005 | Reynisdottir et al. | 704/276 |
| 2006/0100871 | A1* | 5/2006 | Choi et al. | 704/254 |
| 2006/0190256 | A1* | 8/2006 | Stephanick et al. | 704/252 |
| 2007/0293183 | A1* | 12/2007 | Marlowe | 455/345 |
| 2008/0100572 | A1* | 5/2008 | Boillot | 345/158 |
| 2008/0154608 | A1* | 6/2008 | Evermann et al. | 704/270.1 |
| 2009/0076827 | A1* | 3/2009 | Bulitta et al. | 704/275 |
| 2009/0172527 | A1* | 7/2009 | Buecker et al. | 715/700 |
| 2010/0069123 | A1* | 3/2010 | Araradian et al. | 455/566 |
| 2012/0036556 | A1* | 2/2012 | LeBeau et al. | 726/3 |

FOREIGN PATENT DOCUMENTS

| | | | |
|---|---|---|---|
| DE | 102006037156 A1 | 9/2007 | B60R 16/02 |
| DE | 102006028046 A1 | 12/2007 | B60K 35/00 |
| EP | 0680035 A1 | 4/1995 | G10L 5/06 |
| EP | 0939534 A1 | 9/1999 | G10L 15/24 |
| EP | 1168302 A2 | 1/2002 | G10L 15/22 |
| EP | 1555652 A1 | 7/2005 | G10L 15/26 |
| JP | 2007-164814 A | 6/2007 | B60R 11/02 |
| WO | 2006/086511 A2 | 8/2006 | G10L 15/18 |
| WO | 2009/062677 A2 | 5/2009 | G01C 21/36 |

OTHER PUBLICATIONS

English translation of Specification of U.S. Appl. No. 60/995,493 filed Sep. 11, 2008.*
Specification of U.S. Appl. No. 60/855,621, filed Oct. 31, 2006.*
Drawings of U.S. Appl. No. 60/855,621, filed Oct. 31, 2006.*
International PCT Search Report, PCT/EP2008/009535, 20 pages, Mailed May 6, 2009.
Nigay, L., et al., "A Design Space for Multimodal Systems: Concurrent Processing and Data Fusion", Laboratoire de Génie Informatique (IMAG), Grenoble Cedex, France; 7 pages, Apr. 24, 1993.
German Search Report, German patent application No. 102008051757.7, 4 pages, Apr. 7, 2011.
Korean Office Action, Application No. 1020107009294, 7 pages, Mar. 19, 2015.

* cited by examiner

| | Controlling hand not detectable | Presence of a controlling hand in the range d > 5cm detectable | Presence and position of a controlling hand detectable in the range d > 5cm |
|---|---|---|---|
| Input Detection Input Detection M1, M2, M3 | | | |
| | No control intention of the user | General control intention | Potential position of current control target defined |
| Presentation Module Presentation Manager (Procedures) | | | |
| | Display mode: Optimizes entire presentation for information display | Control mode 1: Optimizes entire presentation for manual control | Control mode 2: Optimizes areas aimed at for manual control |

MULTIMODE USER INTERFACE OF A DRIVER ASSISTANCE SYSTEM FOR INPUTTING AND PRESENTATION OF INFORMATION

CROSS-REFERENCE TO RELATED APPLICATIONS

This application is a U.S. National Stage Application of International Application No. PCT/EP2008/009535 filed Nov. 12, 2008, which designates the United States of America, and claims priority to German Application No. 10 2007 053 779.6 filed Nov. 12, 2007, German Application No. 10 2008 051 757.7 filed Oct. 15, 2008 and German Application No. 10 2008 051 756.9 filed Oct. 15, 2008. The contents of which are hereby incorporated by reference in their entirety.

TECHNICAL FIELD

The invention relates to a method for multimode information input and adaptation of the information display, in particular a driver assistance system of a motor vehicle, as well as a system architecture provided for implementing the method.

BACKGROUND

In the light of steadily rising complexities of functions of driver information and driver assistance systems the man-machine-interface (MMI) in future more than ever has to look after reducing the duration and (sensed) complexity of control actions.

Future man-machine-interfaces (MMIs) have to be in a position to integrate a rising number of driver information and driver assistance functions for the user in a comprehensible and operable manner and at the same time to reduce the (sensed) complexity and the duration of individual control actions.

For an optimization of the information input synergistic multimode interfaces may make an important contribution for this. Such interfaces have already generally been described in "Nigay, L. and Coutaz, J. (1993). A design space for multimode systems: concurrent processing and data fusion. In CHI '93: Proceedings of the SIGCHI conference on Human factors in computing systems, pages 172-178, New York, N.Y., USA. ACM Press".

Already today, multimode inputs are feasible in a vehicle—in order to control a function the user may select between several alternative communications modalities (for example voice or manual input). A synergistic and alternating, respectively, multi-modality allows for an increase in efficiency and comfort since inputs executed across several modalities are interpreted as contiguous. This contributes to a "more natural" communication (leaning to the man-man-communication).

In the field of displaying information contents and operating interfaces user interfaces which detect different parameters of the current usage situation—in particular the control intention and the control destination of the user—and deduct therefrom provisions for the adaptation of the user interface in a manner adaptive to the situation show a big potential.

Such systems follow the actions of the user, model the user interest and such anticipate user desires and actions.

For this, the technical system "vehicle" and its specific context of usage in contrast to many other fields of application offer good technical preconditions. As compared to other systems a minor and clearly defined number of interaction feasibilities exist in the vehicle, whereby an anticipation of the control destination may be better reached on the side of the system.

SUMMARY

According to various embodiments, the present communication models can be further improved with respect to the communication feasibilities between man and machine and a method providing communication feasibilities can be provided and a required system can be provided for realizing a faster and more intuitive control of a man-machine-interface.

According to an embodiment, a method for multimode information input and/or adaptation of the display of a display and control device in a motor vehicle which detects input signals of different modality which are supplied to a voice recognition means via the at least one control device, whereby, as an output signal, a desired function and/or display is triggered which is displayed on the display and control device and/or is output via voice output, may comprise touch and/or gesture input signals on or at the display and control device which lead to a selection of an object provided for interaction and to an activation of the voice recognition means and by means of the selection of the object and/or the activation of the voice recognition means a restriction of the vocabulary provided for interaction is carried out depending on the selected object, whereupon as information input and/or for adapting the display via the voice recognition means a voice command associated with the selected object of the restricted vocabulary is added to the selected object.

According to a further embodiment, the display and control device can detect as an input signal and as an activation signal for the voice recognition means: as the first modality touch input signals of the user, such as turning, pressing, touching, switching of control elements, and/or as the second modality gesture input signals of the user. According to a further embodiment, with the provision of the object provided for interaction the voice recognition means of the voice dialog system can be activated by a control action generating touch input signals on or at the display and control device by means of a "long press" touch and/or a "double click" touch and/or a "2 finger touch" and/or a "drag gesture". According to a further embodiment, the voice recognition means of the voice dialog system can be activated automatically at the time of the detection of a control action comprising a "general" control intention generating gesture input signals and only subsequently the provision of the display object provided for interaction is carried out, so that it is ensured that in the case of an early voice input a voice evaluation is carried out by means of the voice recognition means.

According to a further embodiment, the voice recognition means of the voice dialog system after its activation only may be active for a presettable, defined period of time within which a voice command may be added by the user, wherein the activation and the de-activation, respectively, of the voice recognition means is carried out by means of a graphic display—"graphic feedback"—at the region provided for interaction or at the object itself. According to a further embodiment, the added voice command can eb a single word or a multiple words vocable. According to a further embodiment, in a "display object/voice interaction" a voice command in the form of a single word or a multiple words vocable can be added to the specified display object—exclusively by means of one and/or several "verbs"—in order to generate a simple and intuitive multimode control for generating the output signal and the modified function associated therewith and for displaying the display object at the output module. According to a further embodiment, in a "display object context/voice interaction" a voice command in the form of a single word or a multiple words vocable can be added to the specified object—by means of one and/or several context specific vocable/s—in order to generate a simple and intuitive multi-mode control for generating the output signal and the modified display and/or function of the object associated therewith at the display and operating element. According to a further embodiment, the voice command can be superimposed on the display and operating element for a presettable, defined period of time directly after the detection by means of the voice recognition means. According to a further embodiment, the activation and de-activation, respectively, of the voice recognition means can be signalized by means of the graphic display "graphic feedback" at the display and operating element at the region provided for interaction or object and/or via a touch and/or acoustic signal "touch and/or acoustic feedback", wherein the available presettable period of time for inputting the voice command after the activation of the voice recognition means is graphically displayed in the display and operating element at the region provided for interaction or the object itself. According to a further embodiment, at the input of a voice command which does not match the specified display object provided for interaction a graphic and/or acoustic display and a signaling, respectively, can be carried out. According to a further embodiment, a presentation manager connected upstream of the display and control device may decide on the type of output and the selection of the applicable presentation method depending on the input signals. According to a further embodiment, the presentation method can be adapted depending on the input signals delivered to the presentation manager and is carried out by means of modification of the graphical user interface, by means of suitable selection of the display content, by means of communications specific selection of the output medium—display and/or language and output time, respectively. According to a further embodiment, via the display and control device a control intention for the second modality can be input depending on the distance of a control motion from the display and control device, in particular a touchscreen, and a gesture input signal can be detected so that depending on the gesture input signal generated by the control motion a change over according to the situation between a display mode and at least one control mode of the display and control device can be realized. According to a further embodiment, the control intention of the gesture input signal may be overlayable with all further input signals of the further modalities affecting the control intention. According to a further embodiment, the display and control device does not detect a control action so that an information manager connected upstream of the presentation manager does not detect a control intention, wherein the presentation manager with respect to the illustration and display of information contents optimizes the display and control device as "display mode". According to a further embodiment, the display and control device may detect a control action in the region d≥a presettable distance, in particular d≥5 cm, so that the information manager identifies a "general" control intention, wherein the presentation manager optimizes the display of the display and control device in the overall region to the improved control "first control mode". According to a further embodiment, the display and control device may detect a control action in the region d<a presettable distance, in particular d<5 cm, so that the information manager identifies a "potentially aimed at" control intention of a selected object, wherein the presentation manager optimizes the display and control device for improved control of the "potentially aimed at" objects in the aimed at display region "second control mode". According to a further embodiment, the optimization of the control modes may be carried out by means of scaling, superimposition, zooming of presettable display regions, whereby control areas of better usability are generated. According to a further embodiment, information—for example speed, street classification, traffic density, assistance level of the vehicle—can be supplied from a usage context of the vehicle system, whereby an adaption of the available display area on the display of the display and control device is realized on the basis of the stress situation of the user.

According to another embodiment, in a system architecture for multimode information input and adaptation of a display which based on multimode interactions of a user, whose input signals are deliverable via a user interface related to the respective modality via a display and control device and a voice recognition means, wherein for evaluating the input signals an information manager is arranged which depending on the input signals transfers to a presentation manager output signals which may be provided to the user on a display and operating element connected downstream of the presentation manager and/or the voice recognition means, the input signals of the different modalities are synergistic detectable by an information manager and the presentation manager may be activated based on the received input signals of the information manager, and provides to the display and control device and/or the voice recognition means output signals prepared depending on the input signals.

According to a further embodiment of the system, the display and control device detecting input signals can be a display comprising respective control elements or a touch display comprising respective control elements and a respective capacitive sensor system. According to a further embodiment of the system, the display and control device outputting output signals can be a display or a touch display. According to a further embodiment of the system, depending on the input signals detected by the information manager the presentation manager may generate output signals which serve the illustration and control of: control levels for a superordinate selection of different systems, as for example a navigation system comprising system functions as for example route planning, correction of start and/or destination inputs, POI search, POI selection, POI interaction, communications functions or entertainment system comprising system functions as for example selection and correction of music titles.

BRIEF DESCRIPTION OF THE DRAWINGS

Consecutively the invention is described by way of exemplary embodiments on the basis of the related drawings, in which.

DETAILED DESCRIPTION

The following description introduces a method for multimode information input and adaptation of the information display and a system architecture for an adaptive multimode user interface. The method and the system architecture facilitate the control of future automotive systems.

By means of a synergistic multimode information input and an automatic adaptation of the information display the respective situations of usage may be detected easier and more comprehensive.

Typical applications for the interaction techniques are described by way of example with respect to the interaction with menus. For this, included is for example the assignment of control functions, such as moving—zooming, scrolling, on/off, stop and the like, of a monitor or of control functions desired on the monitor or the menu selection functions within a superordinate uppermost selection menu or music selection functions within a selected "music selection menu" or the route planning functions within a selected "route planning menu" or communication functions (for example telephone, Internet) within a selected "communication menu" or POI selection functions within a "POI selection menu" or
route planning functions and/or
communication functions and/or
POI selection functions within a "navigation map menu" superimposed over a navigation map.

Furthermore, introduced is a scaleable system architecture for an adaptive multimode user interface. It allows for multimode input feasibilities which exceed the input feasibilities found in today's production. In particular it comprises system modules for evaluating input signals separately.

Various embodiments emanate from a method by means of which multimode information may be input, wherein the respective information displays adapt depending on the information input. In motor vehicles this method in particular is of importance for driver assistance systems. So far, in most cases input signals of different modalities have been detected and supplied to a detection module. Serving as an input module receiving input signals from different modalities is a display and operating element, for example a conventional display comprising respective control elements or a touch display, which in most cases in addition has further required operating elements. Thereby, by means of controlling the operating elements and/or by means of touching the touch display/touchscreen a certain information input is allowed for and an adaptation of an information display may be carried out, respectively.

In most cases, usable as input signals further are control actions determined by gestures as for example a capacitive arranged sensor system is arranged which allows for such a contactless detection of input signals.

These modalities, the simple touch control action at control elements and/or the haptic "touch control action" and/or the gesture-based "gesture control action" are combined with a voice recognition means for voice recognition.

Various embodiments emanate form a method for multimode information input and/or adaptation of the display of a display and control device in a motor vehicle which detects input signals of different modality which are supplied via the at least one control device and a voice recognition means, whereby, as an output signal, a desired function and/or display is triggered which is displayed on the display and control device and/or is output via voice output.

According to various embodiments, touch and/or gesture input signals on or at the display and control device lead to a selection of an object provided for interaction and to the activation of the voice recognition means and by means of the selection of the object and/or the activation of the voice recognition means a restriction of the vocabulary provided for interaction is carried out depending on the selected object, whereupon added to the selected object as information input and/or for the adaptation of the display via the voice recognition means is a voice command of the restricted vocabulary associated with the selected object.

In a first implementation variant for detecting the input signals the method prefers the utilization of a first modality in the form of touch control actions of the user at the display and operating element, as for example turning, pressing, touching and/or switching of control elements at the detection module.

In a second implementation variant for detecting the input signals preferably a second modality is used where gesture control actions [gesture] of the user—in the form of motions—are detected.

In combination with the first and/or second modality the voice recognition is used as a third modality, i.e. the voice of the user is employed for performing the method.

According to various embodiments, both implementation variants serving the detection of the input signals are also utilized for activating the voice recognition means.

According to various embodiments it is provided for that the voice recognition means of the voice dialog system is activated by means of a touch control action, for example a "long press" touch and/or a "double click" touch, and/or a "drag gesture" and/or a "2 finger touch".

According to various embodiments it is further provided for that the voice recognition means of the voice dialog system is activated automatically already at the time of the detection of a "general" gesture control action at the detection module.

Both types of activation may be carried out in combination.

By means of this solution according to various embodiments the "push to talk" button activating the voice recognition means and until now known from prior art is omitted.

In a further embodiment, independent of the touch and/or gesture activation of the voice recognition means, the latter is active for a presettable defined period of time after the activation, wherein then only during this predetermined period of time a voice command may be added by the user.

Preferably, the added voice command is a single word or a multiple words vocable.

In a first embodiment of the interaction of gesture and/or touch input signals and of the voice input in a so called "display object/voice interaction" a voice command from a given vocabulary is added to the object selected by means of the respective control action in the form of a single word vocable or a multiple words vocable—exclusively by means of one and/or several "verbs"—in order to generate a simple and intuitive multimode control for generating the output signal and the converted function associated therewith and for displaying the display object at the output module.

In a second embodiment of the interaction of gesture and/or touch input signals and of the voice input in a so called "display object context/voice interaction" a "context based" voice command of a given "context specific" vocabulary in the form of a single word vocable or a multiple words vocable is added to the object selected by the respective control action in order to also generate a simple and intuitive multimode control for generating the output signal and the modified function associated therewith and/or for displaying the object at the display and operating element.

It is preferably provided for that the voice recognition means of the voice dialog system after its activation only is active for a presettable defined period of time during which a voice command may be added by the user, wherein the activation and de-activation, respectively, of the voice recognition means is carried out by means of a graphic display—"graphic feedback"—in a therefore provided region at the display and operating element (remote from the interaction object).

It is preferred that the respective voice command itself in a preferred design in both embodiments is overlayed in written form on the display and operating element for a presettable defined period of time immediately after its detection by the voice recognition means.

Also, it is preferred in both embodiments that the activation of the voice recognition means is signalized by means of a graphic display at the display and operating element and/or by means of an acoustic signal of the display and control element, wherein further preferred the presettable remaining duration for inputting the voice command after the activation of the voice recognition means is displayed.

Finally, it is provided for in both embodiments to generate a graphic and/or acoustic message and to output it via the display and operating element or via a voice output device of the voice dialog system in the case of an input of a voice command which does not match the specified display object provided for interaction.

It is further also preferably provided for in both embodiments that the voice recognition means of the voice dialog system after its activation only is active for a presettable defined period of time during which a voice command may be added by the user, wherein the activation and de-activation, respectively, of the voice recognition means is carried out by means of a graphic display—"graphic feedback"—not located remote from the interaction object at the display and operating element but at the object provided for interaction itself. This approach in which a status of the voice recognition means is displayable in different manners is described in more detail in the exemplary embodiments.

Further preferred, formed within the system architecture supporting the method is a presentation manager which decides on the type of output and the selection of the applicable presentation method at the display and operating element depending on the input signals of the different modalities received from an information manager connected upstream.

In a further embodiment the presentation method is adapted depending on the input signals transferred to the presentation manager.

A modification of the presentation is carried out by means of an adaptation of the graphic interface, by means of a suitable selection of the display contents and/or by means of a communication specific selection of the output medium and output time, respectively.

The method further is characterized in that via the display and operating element serving as the detection module a control intention in particular of the second gesture modality [gesture] is input depending on the distance of a control motion from the display and operating element and an input signal is detected, so that depending on the gesture control action a changeover according to the situation between a display mode and at least one control mode of the display and operating element is realized.

In an embodiment the display and operating element of the system architecture at first has the ability to establish wether a control motion at all is present. If no control motion is present then this is detected and processed by the information manager of the system, wherein the presentation manager of the output module is optimized to a "display mode" with respect to the illustration and display of information contents.

When the display and operating element detects a control motion in the range $d \geq a$ presettable distance, in particular $d \geq 5$ cm, then the information manager identifies a "general" control intention, wherein the presentation manager optimizes the output module in the overall display area to a "first control mode" for an improved handling.

When the display and operating element detects a control motion in the range $d < a$ presettable distance, in particular $d < 5$ cm, then the information manager has detected a "potentially aimed at" control intention of a control target as the display object, wherein the presentation manager optimizes the output module for the "potentially aimed at" control targets in the display region aimed at to a "second control mode" for an improved handling.

In an embodiment the optimization of the control modes is carried out by means of scaling, superimposition, zooming of the presettable display region, whereby control areas comprising improved and simplified usability are generated.

In an embodiment the voice recognition means of the voice dialog system is already initiated automatically at the time of the detection of the general control intention as described above.

In an embodiment the input signals of the different modalities produced consecutively or in parallel are used for a verification of the input signals among each other.

Lastly the method is characterized in that depending on respective also temporal superimposable input signals corresponding output signals are generated which serve the illustration and control of control levels and the selection of different systems provided with several control levels. To be understood as applications are functions of a navigation system and an entertainment system which comprise different function contents performable within the respective system.

Therefore, according to various embodiments assigned to the method is a system architecture for inputting multimode information and adapting an information display which is implemented such that input signals may be supplied by means of a user interface assigned to the respective modality via a display and operating element and a voice recognition means.

The system is characterized in that the input signals of the different modalities may be detected in a synergistic manner by an information manager and the presentation manager may be controlled based on the input signals received from the information manager and provides to the display and control device and/or the voice recognition means output signals arranged depending on the input signals.

Depending on the modality the display and operating element is a conventional display comprising dedicated control elements or a touchscreen which in one embodiment is provided with a dedicated capacitive sensory system to which further operating elements may be assigned in addition.

Preferably, arranged for evaluating the input signals is the information manager which transfers the input signals to a presentation manager so that the output signals of the information manager arranged for presentation by a presentation manager may be provided to the display and operating element for display.

A prerequisite for the respective interaction at first is the manner of provision of the object provided for interaction. Conceived as an object are single objects as well as areas with which and in which, respectively, the interaction takes place.

This provision is carried out in the first implementation variant by detecting the input signals using a first modality M1 in the form of haptic control actions of the user at the display and operating element, as for example turning, pressing, touching, switching of control elements.

In a second implementation variant the provision of the object provided for interaction is carried out by detecting the input signals by means of a second modality M2 in which the gesture control actions—in the form of motions—of the user 10 are detected and evaluated.

A prerequisite for the improved interaction is the activation of the voice recognition means in connection with the provision of the object provided for interaction.

In the first implementation variant, for activating the voice recognition means serves a touch control action M1, as for example a "long press" touch and/or a "double click" touch, and/or a "drag gesture" and/or a "2 finger touch" on a control device.

In the second implementation variant it is provided for that the voice recognition means of the voice dialog system already is activated automatically at the time of the detection of a "general" gesture control action M2.

The two implementation variants may be carried out individually or in combination.

When the voice recognition means is active in the third modality M3 voice commands may be input by the user 10. In doing so, the method may be conducted such that the voice recognition means is only active for a presettable defined period of time, wherein the period of time is displayed on the display and control device 20, 60 for the user 10.

Once all prerequisites are fulfilled the interaction takes place which is described as the first embodiment of the "display object/voice interaction" without Figures, however, by means of the reference numerals of the later described second embodiment in order to clarify the relation to the second embodiment.

Subsequently the description is carried out on the basis of the attached Figures by means of a second embodiment of the "display object context/voice interaction".

First embodiment, the "display object/voice interaction":

In one of the embodiments, the "display object/voice interaction", the method is carried out by means of a haptic and/or a gesture control action M1, M2 and a voice command M3 as follows.

At first the object is selected by means of one of the control actions M1 and/or M2, wherein simultaneously and automatically at least one of the two control actions of the voice recognition means is started.

In the "display object/voice interaction" the voice recognition means exclusively is configured to detect one or several verbs of a verb vocabulary restricted and stored in the voice recognition means. Since verbs are easy to speak an intuitive combination results in the object selected by means of the control action M1 and/or M2 and a voice command M3 comprising at least one verb. This procedure conforms to the fundamental modes of operation and procedures of human practice and speech, in particular a kind of child speech, which is particularly intuitive.

For a clarification of the interaction subsequently some examples are mentioned which are initiated by at least one touch control action M1 for the provision of the object at a display and control device, for example a touch display or a touchscreen. As described, the provision of the object may also be initiated by means of gesture control actions M2 or by means of a combination of the control actions M1, M2.

On the map of the touchscreens 20 the user 10 touches a location or a POI icon and simultaneously says "drive there", "store", "call" or "drive past".

On the touchscreen 20 the user 10 for example views his music via cover-flow. He touches a music album cover and says "play", "delete", "copy" or "memorize".

User 10 listens to HD Radio in the USA. On the touchscreen 20 he touches the title display of the current song on the display and says "get". Thereupon, at home iTunes offers the marked songs for buying.

On the touchscreen 20 user 10 views his contacts in the form of photos, touches one and says "call", "mail" or "drive there".

On the display of the touchscreen 20, 60 user 10 views a graphics of his vehicle, touches the luggage trunk or a window and says "close".

Second embodiment, the "display object context/voice interaction":

In its second embodiment, the so called "display object context/voice interaction", various embodiments are described on the basis of FIGS. 1A to 9B.

Also here it is offered to a user, the driver or co-driver 10, to supply an input signal M of different modalities M1, M2, M3 to a display and operating element 20 and/or a voice recognition means.

At first, by means of a control action M1 and/or M2 as already described in connection with the first embodiment the provision of the object and simultaneously and automatically with the provision of the object the activation of the voice recognition means is carried out. As an example, control actions such as turning/pressing or the like may be carried out for activating the voice recognition means or as already described in connection with the first embodiment for activating the voice recognition means in the first implementation variant a touch control action M1, a "long press" touch and/or a "double click" touch, and/or a "drag gesture" and/or a "2 finger touch" is carried out or it is provided for in the second implementation variant that the voice recognition means of the voice dialog system is already activated automatically at the time of detecting a "general" touch control action M2 at the detection module.

In the second embodiment, the "display object context/voice interaction", the voice command M3 provided for interaction is a single word or a multiple words vocable from a restricted, context specific vocabulary for specific reasonable actions of the respective specified display object. This context based single word or multiple words vocable may be a verb and/or a substantive also here. However, the vocabulary is restricted and fitted, respectively, to the respective context. Thereby a faster and simpler interaction between user and system architecture develops, whereby memory capacity is saved in the corresponding system architecture.

The further description is carried out with relation to the system architecture according to various embodiments which allows for this method.

Assigned to each of the modalities M1, M2, M3 is a respective user interface, for example a touchscreen 20 comprising control elements for the first modality M1, where applicable; a sensor system, in particular a capacitive sensor system, for the second modality M2 for detecting gesture control actions; a voice recognition means for the third modality M3 of the voice recognition.

Furthermore, an information manager is provided which evaluates the input signals and the signal portions of the modalities M1, M2, M3, respectively, in a synergistic manner.

The output signals of the information manager are supplied to a presentation manager which forms the user interface for outputting notifications and information by means of a display and operating element and the voice output device of the voice recognition means, respectively, on which output signals in the form of animated graphics and acoustics, respectively, are supplied to the driver or co-driver 10.

Depending on the signals transferred by the information manager the presentation manager thereby decides about the type of output and the selection of the applicable presentation method.

An implementation of the adaptive multimode user interfaces, for example of a "navigation system", is described incorporating the voice recognition comprising a user interface of the voice recognition means, a gesture recognition comprising a user interface—capacitive sensor system—and a detection of a gesture control action at a user interface of a touchscreen interface 20, 60 as a display and control device.

The detection of the motion of the hand and/or—the position in a gesture recognition M2 is carried out by means of capacitive proximity sensors which for example are mounted at the corners of the touchscreen 20.

Figure 10:
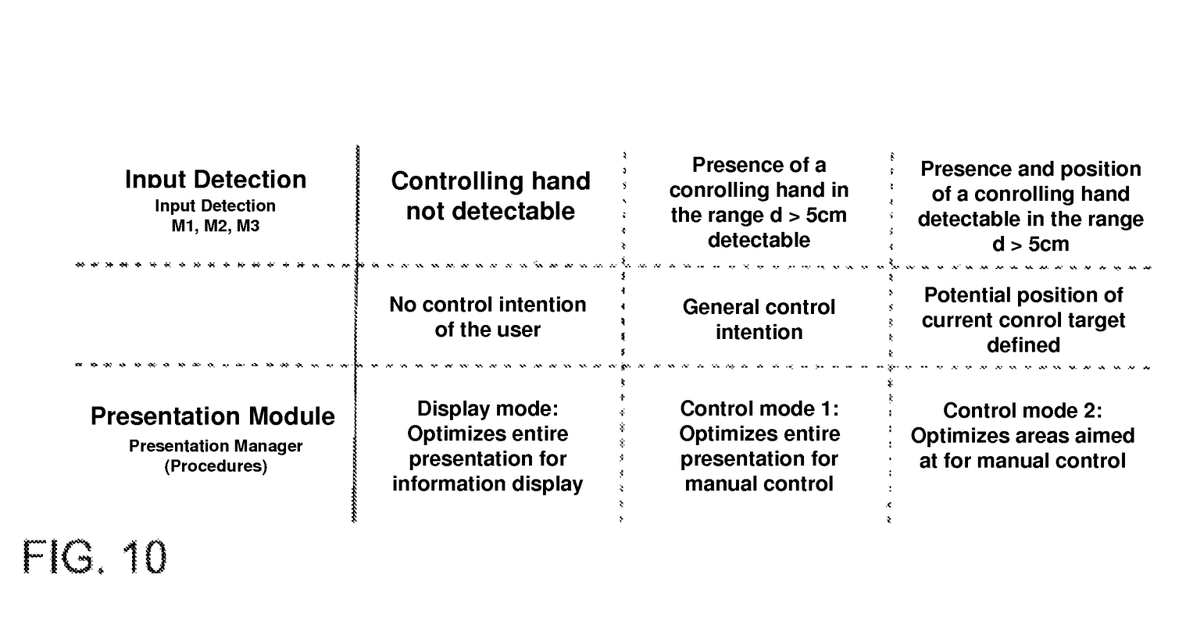
FIG. 10 shows the system states during a defined approach of the controlling hand towards a touchscreen.

As shown in FIG. 10, a defined approach from a distance of about 10 cm towards the navigation display implemented as a touchscreen 20 is considered to be a general control intention by the system.

Thereupon, the presentation manager adapts the input signals received from the information manager for the information display on the touchscreen 20 in favor of an improved usability of the push buttons provided (for example POI icons) by means of scaling and superimposition of additional control options.

The table of FIG. 10 discriminates the presence of a controlling hand with respect to the existence of an input signal and assigns a certain control intention to this respective presence, wherein in addition depending on the presence of the controlling hand the presentation manager switches to a presettable mode.

When a controlling hand is not detected, then no control intention of the user 10 is detected and the presentation module, based on the data overall present in the information manager optimizes the illustration for displaying information contents, the so called display mode.

Already from a distance of about 5 cm, thus $d \geq 5$ cm, a presence is detectable in the range of the navigation display which is detected as a "general" control intention.

Thereupon, via the information manager, the optimization of the overall display takes place for a feasible manual control, the so called first control mode at the presentation manager.

Form a distance of about <5 cm the precise operative control target results from the respective push button on the touchscreen 20, 60 aimed at by the index finger of the user 10. The presence and position of a controlling hand is detected and the potential position of the current control target is defined as the display object. Via the information manager an optimization of the area aimed at for the manual "finger"-control takes place by means of the presentation manager, the so called second control mode.

The optimized push button aimed at in addition is scaled so that the aiming action for actuating the "button" displayed on the touchscreen 20 once more is simplified.

With current user interfaces based on a touchscreen 20 in the vehicle the dimensions of the push buttons mostly are reduced to an ergonomically acceptable minimum in order to provide space for a parallel display of information with limited display size.

By means of the changeover according to the situation between the display mode and the first or second control mode the limited display area of touchscreens 20 in the vehicle under the assumption of a control intention may be used efficiently for the display of information contents in clearly arranged illustrations as well as for the illustration of particular control areas.

Figures 1A, 1B:
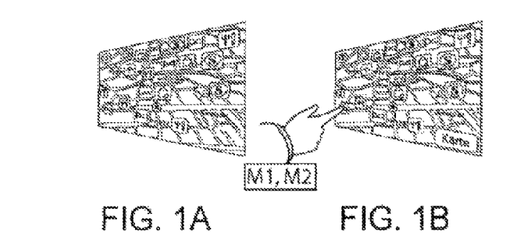
FIGS. 1A to 1C show an adaptation of the display during an approach of a controlling hand within a navigation map menu.
Figure 1C:
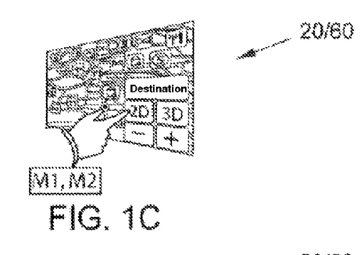

Using the example of the manual interaction with a POI icon in a navigation map on a touchscreen 20, 60 implemented by way of example is this method which at first is described on the basis of FIGS. 1A to 1C.

FIG. 1A shows a touchscreen 20, 60 of a navigation system where a controlling hand has not yet been detected so that the information display in the display mode is optimized across the complete touchscreen 20, 60.

During a general approach (general control intention) of the controlling hand according to FIG. 1B the size of the POI icon already is scaled. In this connection, street names, route information and other details are partly covered since they are not of relevance during the time period of the control action. Therefore, already an optimization into the first control mode for the following manual control takes place.

During aiming at the "indicator"—the object selected for interaction—according to FIG. 1C for the operating option for manipulating the map view these are superimposed at corresponding positions without the user having to actuate a button.

This gesture control action M2 carried out in FIG. 1C initiates the second control mode in which the regions aimed at are optimized for the manual control.

For the specification of objects, geometric dimensions and positions as well as for adjusting scales (for example for volume control) by means of the touchscreen 20, 60 again touch inputs and/or gesture pointing motions are suitable.

For inputting names, terms and commands speech often is more suitable.

The so called synergistic multi-modality (control actions and voice input) aside from shorter control times by means of parallel information inputs also allows for a reduction of operating errors since the inputs via a control modality each may contribute for verifying the inputs of the respective control modality used in parallel.

Furthermore, operating elements and control steps may be reduced in that for example in the case of respective haptic and/or gesture interactions with the navigation map the voice recognition means is activated automatically instead of by means of a "push to talk" button.

Commands including spatial geometric specifications, as they for example occur during the interaction with maps, are the most common type of task for the application of such synergistic systems.

Figure 2A:
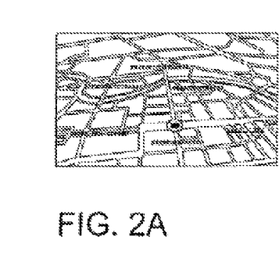
FIGS. 2A to 2C show the operating activity of a synergistic multimode POI search within the navigation map menu.
Figure 2B:
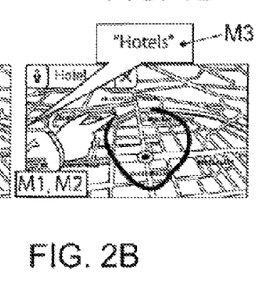
Figure 2C:
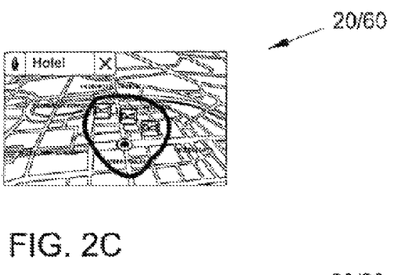

An exemplary implementation demonstrates a location based multimode search for POIs in a special topic category, as for example "hotels" or "restaurants", on the basis of FIGS. 2A to 2C.

In this connection, the user specifies the sought POI category via voice M3 and simultaneously defines the specific search region by means of a manual pointing gesture M2—for example free 'outlining' of the search region—on the touchscreen 20, 60.

FIG. 2A shows the touchscreen prior to the voice command M3.

According to the FIGS. 2A to 2C the voice recognition means is activated automatically as soon as the system detects the start of the pointing gesture and/or of a haptic control action M1, M2. The determined context based search term, for example "hotels", is superimposed on the display 20 and upon finishing the pointing gesture and/or a haptic control action M1, M2 (see FIG. 5B) the located POIs within the specified search region are displayed on the map, here the hotels of the specific search region (FIG. 2C).

By means of activating the voice recognition M3 out of the defined application context of the navigation map only the context based vocabulary meaningful in the respective application context and restricted to the context is used as a basis for the identification and thereby the error rate is kept low.

Figure 3A:
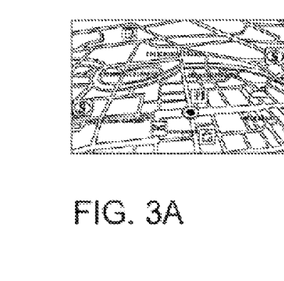
FIGS. 3A to 3C show the operating activity of a synergistic multimode interaction with a POI within the navigation map menu.
Figure 3B:
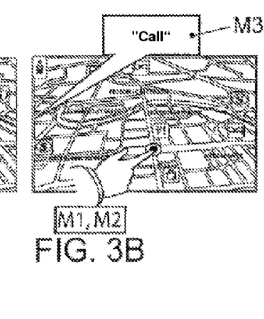
Figure 3C:
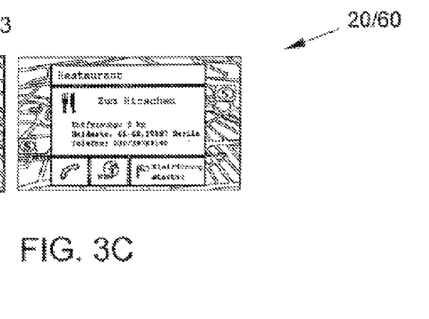

A further application for synergistic multimode inputs in the context of navigation is depicted in FIGS. 3A to 3C. A direct interaction with a POI, based on FIG. 3A, takes place in the following way. Instead of specifying the desired POI via voice (problematic with several POIs of the same category)—as in the solution described with FIGS. 2A to 2C—or to select the desired action (for example "call") purely manual via a menu by means of a touch control action M3—this requires longer operating times and averting of viewing directions— the user may select the POI via a pointing gesture M2 (FIG. 3B) and may input the desired action M3 via voice in parallel thereto.

Also here only the restricted context related vocabulary of the terms for controlling a POI action is taken as a basis for the voice recognition M3 so that also in this example the probability of error detections is kept low. By means of the evaluation of the temporal and semantic synchrony of the inputs M1, M2, M3 the system as described above decides with the aid of the evaluation of the input signals interfering with each other with respect to the modality M1, M2, M3, where applicable, the respective display of the POI menu.

At detecting a voice command M3 the action "call" is carried out directly and the POI menu is not invoked, see FIG. 3C. The context related voice interaction does not exclude the use of single verbs.

Only in the case of a voice command not detected or not carried out the POI menu is invoked, see FIG. 3C. User 10 now again may specify the desired option on the menu displayed according to FIG. 3C via voice M3 or by means of the touchscreen 20, 60 by the use of the control action M1 and/or M2 and/or M3.

With the help of the FIGS. 1A to 3C it was already shown that the detection of such inputs holds a great potential for the adaptation of the HMI to the control situation and therefore for comfort and safety.

With the help of the FIGS. 4A to 9B further application feasibilities shall be described which are practicable by using the method and the system architecture, respectively. FIGS. 4A to 9B also clarify the method for multimode input of voice commands M3 as well as haptic and/or gesture control actions M1, M2.

Also here it is acted on the assumption that at least the input signals M1, M2, M3 detectable for joint processing by the system architecture and the corresponding method are used.

Figures 4A, 4B, 5A, 5B, 5C:
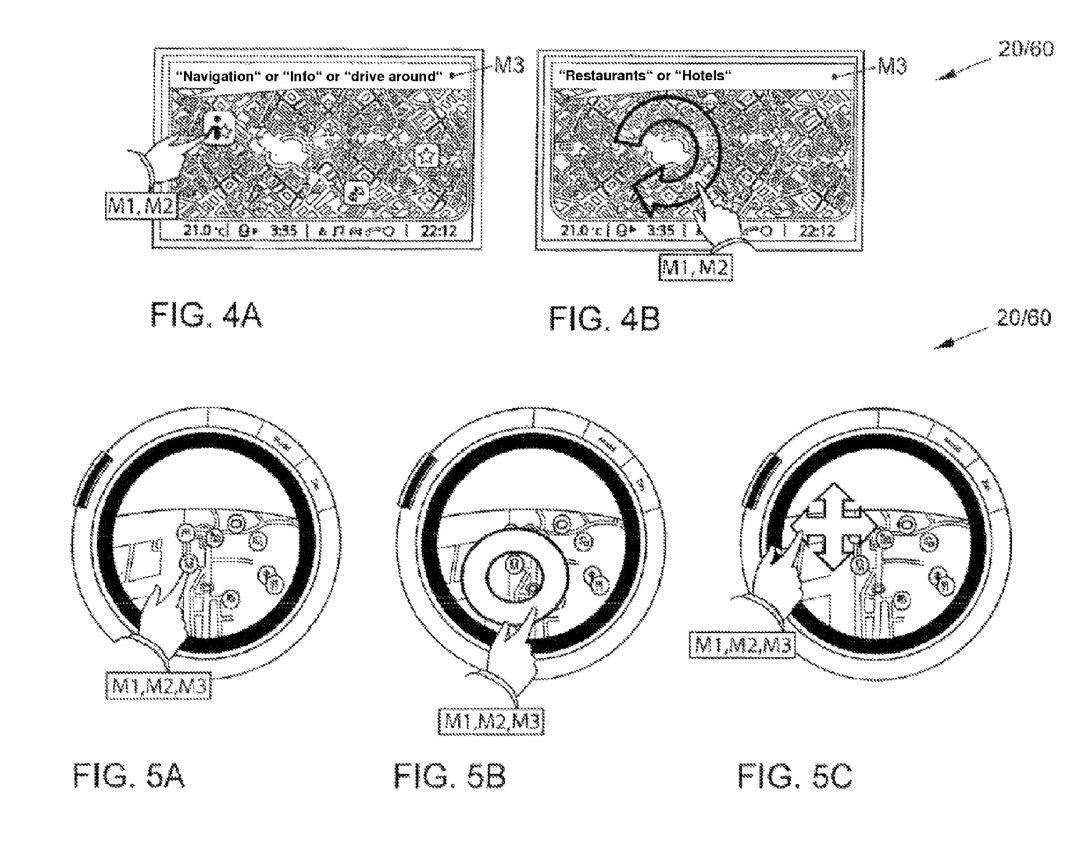
FIGS. 4A to 4B show the operating activity of a synergistic multimode interaction with a POI within the navigation map menu.
FIGS. 5A to 5C show the operating activity of a synergistic multimode interaction with a POI within the navigation map menu.

FIG. 4A already shows the first control mode in which as already described in connection with FIG. 3 the display for the manual control already has been optimized. A provision and specification of an object at a specific position, either by means of a gesture approach M2 towards the display 20, 60 or by means of a haptic touch input M1 on the display 20, 60 has already been carried out. In this connection the voice recognition means may already have been activated again while the control action M1, M2 detects the gesture presence of the controlling hand and/or the touch selection by means of the control finger in the region of the POI object.

For example, an activation of the voice recognition means takes place during pressing M1 "long press" onto the POI object.

Both variants, gesture and/or touch activation of the voice recognition means, may be carried out individually or in combination. In the context of the selected POI now the input of a voice command is feasible by means of the voice recognition means which for example conforms with "navigation" or "info" or "drive around".

FIG. 4B again shows the feasibility of the location specific POI search by means of gesture presence M2 of a controlling hand in the range of the touchscreen 20, 60.

Where applicable the display is optimized beforehand according to the description in connection with FIG. 3 and a circling motion of the finger takes place as a control action in the modality M2.

Simultaneously for example the voice recognition means is activated as a further user interface or POI buttons appear, wherein the POI search by means of voice input is continued in that a voice command M3, for example "restaurants" or "hotels", is entered via voice input.

On the basis of FIGS. 5A to 5C further examples are described in the following which shall clarify the principle of the multimode POI control.

According to FIG. 5A user 10 points at a POI using his finger, wherein the display and operating element 60 serving as an output module changes over into the first or second control mode. Parallel thereto user 10 voices a voice command M3. Therefore, the input command and the input signal, respectively, is comprised of a pointing gesture M2 and a spoken information M3 as an input signal.

The voice recognition means identifies the voice command/s M3 and by means of the capacitive sensor system of the touchscreen 20, 60 gesture control actions M2 are detected in parallel.

User 10, in a first step, for example again carries out a control action M1 and M2 or only M2 (gesture without touching the touchscreen) towards the desired POI icon with a parallel context related voice command M3 in each case, for example "information!", so that by means of a multimodal input command M1, M2, M3 or M2, M3 or M1, M3 with the aid of the system for example automatically acoustic or graphic animations are provided as an information about the "Museum of modern Art" on the display and control device 60.

Subsequently the user 10 for example wishes to establish a telephone connection. For example, he again carries out the control action M1 and M2 or only M2 (for example gesture activation without touching the touchscreen) towards the desired POI icon and in each case voices a parallel voice command M3, for example "call!". The input command M3 is verified by means of the voice recognition means provided to the system on the basis of the restricted context related vocabulary and the system automatically sets up a telephone connection with the "Museum of modern Art".

For example it is also feasible by means of the control action M1 and M2 or only M2 (gesture activation without touching the touchscreen) M1, M2 on or towards the POI icon and in parallel to enter a voice input M3, for example "route guidance!", via voice input in order to start the route guidance to the "Museum of modern Art" via the navigation system of the vehicle after evaluating the input commands M and to depict it graphically by means of the display of the display and operating element 60.

FIG. 5B shows the control action "encircling gesture" M2 on a navigation display and again for example a parallel voice command M3 "restaurants!" is carried out. Thereby the display of all restaurants in this encircled area on the display and control device 60 of the display of a navigation system takes place.

In FIG. 5C the user 10 for example carries out a pointing gesture M2 and in parallel a voice command M3, for example "zoom!", or a pointing gesture M2 and a voice command M3 "browse!" or a pointing gesture and for example a voice command M3 "move map". Then, the respective "zooming", "scrolling" or "browsing" of the navigation map takes place on the display and control device 20, 60 of the navigation system.

It is true for all already described examples and the following examples that the context related voice command as input signal M3 does not necessarily have to be carried out in parallel with input command M1 and/or M2. It is also conceivable that the voice command M3 takes place shortly before or after the further input command M1 and/or M2. The system and method tries to realize a coordinated multimode input which most conforms to the natural behavior of the user 10.

Figure 6A:
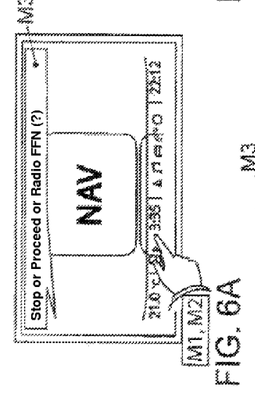
FIGS. 6A to 6B show the operating activity of a synergistic multimode menu function within a superordinate topmost selection menu.
Figure 6B:
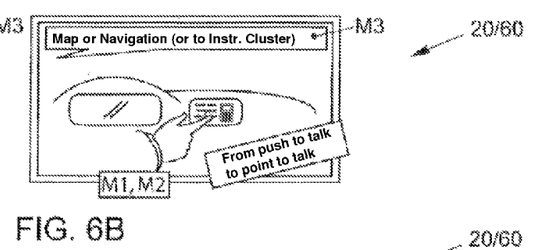

Further examples of the multimode usability are depicted in FIGS. 6A and 6B and are described in more detail in the following.

According to FIGS. 6A and 6B at first it is illustrated that by pressing and/or pointing M1, M2 on or towards a presentation of an input module 20 in the first or second control mode—see description in connection with FIG. 10—depending on the illustration a specific context of a voice command M3 results.

The system architecture at first pre-sorts the application specific vocabularies and by means of activating the user interface of the voice recognition means offers certain voice commands M3, as for example "stop" or "proceed" or "radio FFN", in a restricted application specific and context specific relation, respectively.

The activation of the voice recognition means takes place in the case of sufficient presence of the control action M2 and/or at M1 "press hold", wherein the commands M3 to be spoken even are given on the display and control device 20, 60. By means of this solution no repositioning of the hand to a "push to talk" button, for example positioned at the steering wheel, is required.

In addition, this solution is also illustrated by means of FIG. 6B. It shows that a clearly arranged application of a presentation takes place on a detection module 20 and at a respective approach M2 or pressing M1 "press hold" the voice recognition means is activated and the display of the context related voice command M3, as for example "map" or "navigation" or "into the instrument cluster (Kombi)" takes place for example based on a general view illustration. By means of this solution the different modalities M1, M2, M3 lead to a distinct executable command which may be realized by the system.

Figure 7A:
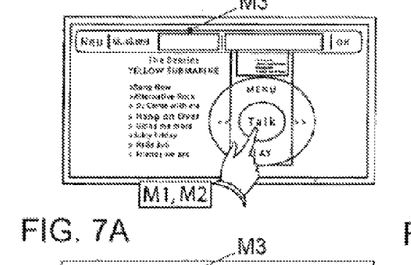
FIGS. 7A to 7B show the operating activity of a synergistic multimode music selection function within a music selection menu.
Figure 7B:
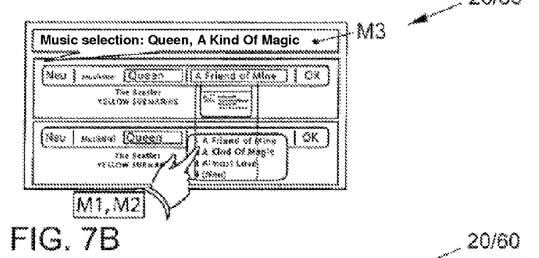

As shown in FIGS. 7A and 7B in certain applications the multimode input is also feasible via voice input M3 and touch/gesture commands M1, M2, respectively. Described as an example may be the music title selection on the basis of an illustrated iPod (FIG. 10A) and a music title selection illustration of another type according to FIG. 10B, respectively. By means of an approaching control action M2 in the first and second control mode, respectively, above a touch interface 20, for example a "automotive ClickWheel" is activated and illustrated automatically, in addition the voice recognition device is activated automatically or by means of a direct "touch command" M1 for example, so that the respective music title, for example "A Kind of Magic" instead of the music title "A Friend of Mine", again may be selected either by means of a further "touch command" M1 or by means of an approach command M2 or a combination thereof and/or via a anew voice input M3.

Again, also here a separate pressing of a "push to talk" button is not required since the voice recognition means is already activated by means of an approach of the control action M2 or by means of pressing M1 on the touchscreen 20 (FIG. 7A "talk"). A repositioning of the hand to a "push to talk" button is omitted. The system therefore constitutes an innovation from "push to talk" to "point to talk" and "touch to talk", respectively.

It is to be noted in addition that where applicable the correction of single selections may be carried out on the basis of the illustrated segments of the iPod (FIG. 10A) or opening control panels (FIG. 10B) again via touchscreen 20, thus touch control action M1, and/or via gesture approach control action M2 and/or via voice control action M3.

Figure 8A:
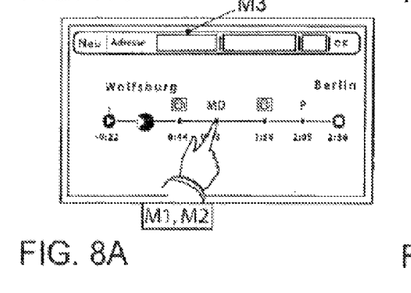
FIGS. 8A to 8B show the operating activity of a synergistic multimode route planning function within a route planning menu.
Figure 8B:
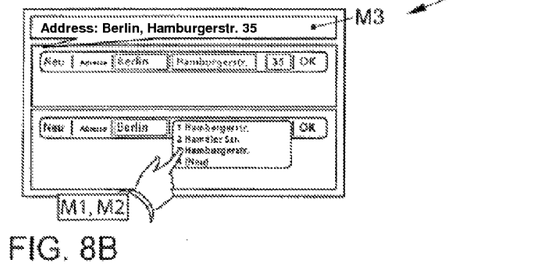

Analogous to the procedure just described, with the music title selection at the iPod or the like, the multimode destination input is illustrated on the basis of a navigation widget in FIGS. 8A and 8B.

For example, the voice recognition means again is activated by means of approach/pointing M2 towards or at the display 20, 60 and subsequently for example the selection and correction of individual segments takes place via control action M1 and/or M2 and the illustration on the touchscreen 20, 60 is carried out.

By means of activating the voice recognition module the respective destination and the respective route, respectively (see for example FIG. 8A) may now be entered via voice input, so that here for example a route display Wolfsburg-Berlin takes place according to FIG. 8A and the input and correction of a destination then again is carried out according to FIG. 8B either via touch control action M1 or M1 and M2 and/or only by means of a correcting voice command M3 so that for example an unclear context-based voice command, for example "Hambergstraβe" instead of the desired "Hamburgstraβe", again may be corrected manually via control action M1 or M1, M2 or again via voice command M3.

Figure 9A:
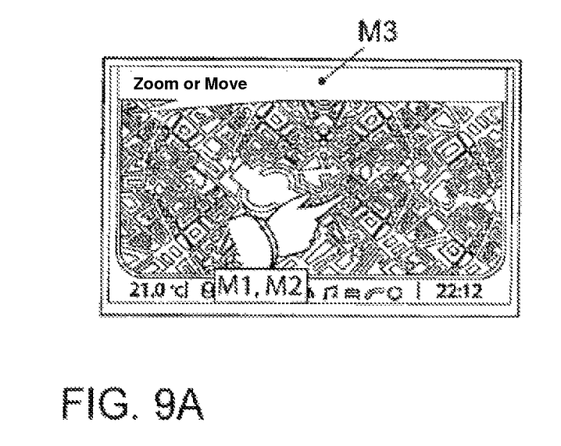
FIGS. 9A to 9B shows the operating activity of a synergistic multimode control function.

FIGS. 9A and 9B yet show the feasibility of the multimode input of function assignments and assignments of overall gestures, respectively. Thus, according to FIG. 9A, as already described in connection with FIG. 5C, it is feasible for example to move a navigation map on the touchscreen 20 after an approach by the controlling hand by means of a gesture input command M2 and a respective parallel or subsequent voice command M3 "zoom" or "move".

Figure 9B:
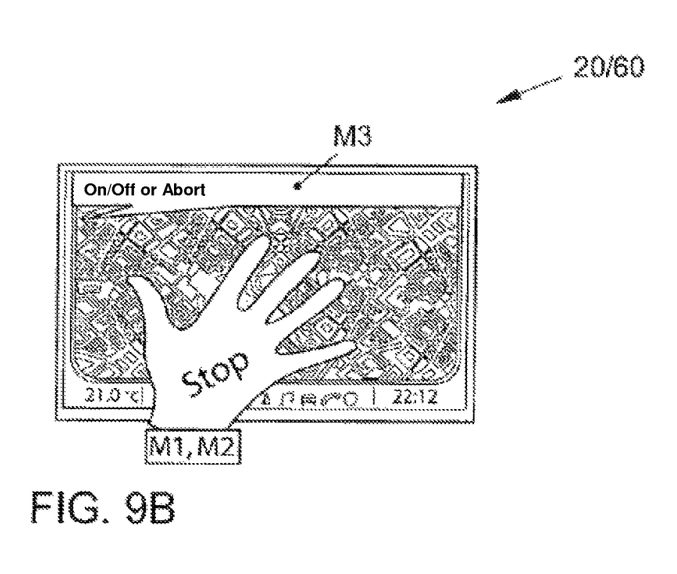

In addition an on/off function or an abort function may for example be assigned to a gesture M2, as for example the hand spread of the complete hand. Thereby, a multimode control for starting or stopping a system may be realized in connection with a voice command M3, for example "on/off" or "abort".

A further addition of the system is feasible by means of the integration of context information from the vehicle system related to the current driving task (for example speed, road rating, traffic density, assistance level of the vehicle) in order to realize an adaption of the available display area on the touchscreen 20, 60 on the basis of the stress situation of the user 10.

Introduced in the FIGS. 11 to 14 is a display feasibility about the status (active/inactive) of the voice recognition means. It has already been described that it is preferably provided for in both embodiments, the "display object/voice interaction" and the "display object context/voice interaction", that the voice recognition means of the voice dialog system is only active for a presettable defined period of time after its activation. Within this period of time a voice command M3 may be added by the user.

In a known variant of the signaling for the user 10 whether the voice recognition means is active or inactive a graphic display takes place at the time of the activation and de-activation, respectively, of the voice recognition means—a so called "graphic feedback"—remote from the interaction object or the region provided for interaction at or on the display and operating element 20, 60.

With the new variant the—"graphic feedback"—does not take place remote from the object or region provided for interaction, but at the object or region provided for interaction itself. Here, no separate region for the output of a feedback about the status of the voice recognition means has to be assigned on or at the display and operating element 20, 60 and for the user 10 the graphic feedback advantageously is directly associated with the interaction object provided for interaction or the interaction region.

The basic process with the activation and de-activation of the voice recognition means in connection with the graphic feedback is the following. In the region provided for interaction or at an object provided for interaction the activation of the voice recognition means for example is carried out by means of the "long press touch" already described as one of the feasible alternatives. Thereby, for activating any point may be touched in the region or object provided for interaction on the display and operating element 20, 60 which thereby has to be maintained for some presettable time. At first, in a possible combination with the graphic feedback, a "haptic feedback" is generated during the "long press touch" in the "correct" region provided for the activation or during a sufficiently long touch of the object, for example a vibration at the finger of the user. At the moment at which the "long press touch" has been accepted as the initiating action for the activation of the voice recognition means in addition a further noticeable "haptic feedback" in the form of a click type vibration is carried out as a signal-like response to the user 10 to inform that the desired control action has been successful. In a further combination this noticeable "touch feedback" may be carried out together with an "acoustic feedback" triggered in parallel. Thus the voice recognition means is started and the successful start thus has been signaled to the user in a haptic and/or acoustic manner.

However, until the voice recognition means is active yet a presettable period of time elapses which is displayed for the user 10 as a "graphic feedback". Around the region and the object, respectively, a kind of frame-like band starts to circulate for a presettable period of time until a voice recognition means symbol S appears. Only at this moment the voice recognition means is active, i.e. is active to receive voice commands M3 and a voice command M3 may be entered via voice input. Thereby different feasibilities for the embodiment of the illustration of the graphic feedback exist.

For example, the frame-like band—preferably distinguished in its luminosity and/or color compared to the display and operating element 20, 60—starts to move in the lower right corner of a region or an object and in an embodiment moves in two directions to the upper left corner forming a frame R, wherein at the moment the left upper corner is reached and the frame R is completed exactly there the voice recognition means symbol S appears. See FIGS. 11 and 13.

It is another feasible embodiment that the circumferential band forming a frame R around the object or the region moves to both sides from the center of the vertical borders of the region or of the object—with equal or different speeds—, closes on the opposite side and therefore forms a frame R and that the voice recognition means symbol S appears on the opposite side in the center of the vertical border located there. See FIGS. 12 and 14.

In a further embodiment the circumferential band may start to form emanating from any arbitrary border position of the region or object and only move in one direction or two directions, wherein at the moment at which the frame R thus formed closes the voice recognition means symbol S is displayed, whereupon the voice recognition means is made active.

For example, the de-activation in each case takes place based on the position at which the band initially has started to form the frame R in the direction of the voice recognition means symbol S as the band moving in one direction or in both directions is again faded out, wherein the voice recognition means then is made inactive as soon as the frame R and the voice recognition means symbol S again have disappeared completely.

At the moment of the appearance of the voice recognition means symbol S the voice command M3 may be entered via voice input. The frame R opens after a presettable period of time independent of wether a voice command M3 has been entered via voice input or not after the appearance of the voice recognition means symbol S under perpetuation of the voice recognition means symbol S for example again at the position at which the band has started to form the frame R. The circumferential band therefore again disintegrates in the direction of the voice recognition means symbol S, whereupon the voice recognition means symbol S disappears at the moment at which the frame R disappears completely or in the case of a remaining frame R the colored embodiment is not anymore visible or the previously increased luminosity has been reset. Then the voice recognition means is again inactive.

Various embodiments of the present application are to be described in more detail by means of four examples and the FIGS. 11 to 14.

Figure 11:
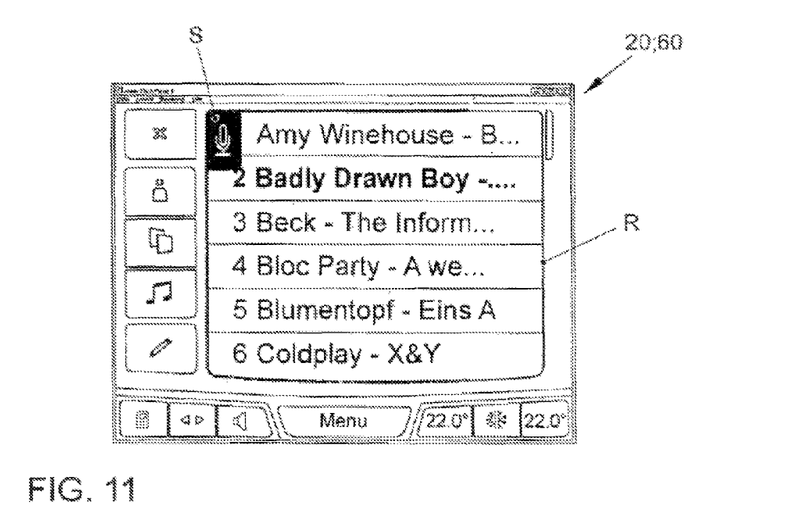
FIG. 11 shows the graphic dialog for the status display of the voice recognition means at the selected interaction object using the example of a playlist.

Illustrated in FIG. 11 is this solution on the basis of a playlist which already has been invoked in the display and operating element 20, 60. As an example, the playlist comprising the titles 1 to 6 in a basic view not yet is surrounded by a frame R and the voice recognition means symbol S is not yet displayed. By means of a "long press touch" onto the display and operating element 20, 60 the initiating control action for activating the voice recognition means is carried out, for example in combination with a "haptic" and/or "acoustic" feedback, for signaling the successful control action of the user 10 as already described above in general. Emanating from a lower right corner the frame R has closed in the upper left corner and the voice recognition means symbol S appears.

Provided to the user is therefore the "graphic feedback" so that he may detect exactly when the voice recognition means is active. The voice input M3 is carried out in consideration of the first and second embodiment, respectively, using a vocabulary in the meantime provided for and restricted for the interaction with the selected object or region. In FIG. 11 the user 10 for example has entered the title 2 "Badly Drawn Boy" via voice input. The sortation of the titles in the display and control device 20, 60 is carried out such that the selected title 2 is highlighted and in an embodiment further moves into the central field of vision of the user on the display and control device 20, 60. In an improvement of this embodiment, sorted below are in the context of the restricted vocabulary for example phonetic similar sounding titles, for example the title 3 "Beck—The Inform . . . ", title 4 and 5 and so forth. Already after the superimposition of the voice recognition means symbol S, based on the position at which the frame R initially had been formed by the band (as illustrated in FIG. 11), the band forming the frame R moves back in the direction of the voice recognition means symbol S and the voice recognition means becomes inactive upon reaching the symbol S and the symbol S is faded out again.

Figure 12:
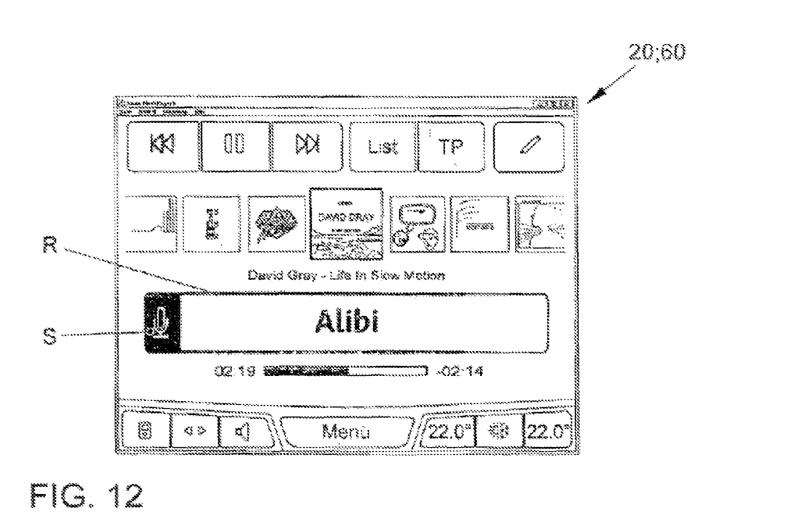
FIG. 12 shows the graphic dialog for the status display of the voice recognition means at the selected interaction object using the example of a media player.

Using the example of a media player this procedure is illustrated in FIG. 12. Illustrated in a basic view is for example a album view "David Grey" and a title "Alibi" played from this album as well as its elapsed runtime and remaining runtime in a title display. The following description may be transferred analogously to the selection of an album above the region of the title display in the region of the displayed album covers.

In order to change a title of the already previously selected album again a "long press touch" is carried out exemplary, where applicable in combination with a haptic and/or acoustic feedback for the user 10 in the region of the title display. Emanating from the center at the right border of the region the circumferential band closes in the center of the left border of the so forming frame R and the voice recognition means symbol S appears at the left border. The voice recognition means is active and ready for voice input. The voice input M3 is carried out in consideration of the first and second embodiment, respectively, with a vocabulary restricted to the interaction with the selected object and the intended region, respectively. For example, according to FIG. 12 the user has entered the voice command "Alibi" via voice input, whereby this title is played from the respective album. Subsequently the circumferential frame again opens in the center of the right border and disappears in the direction of the voice recognition means symbol S which after arriving at the symbol S is faded out again while the voice recognition means is made inactive.

Figure 13:
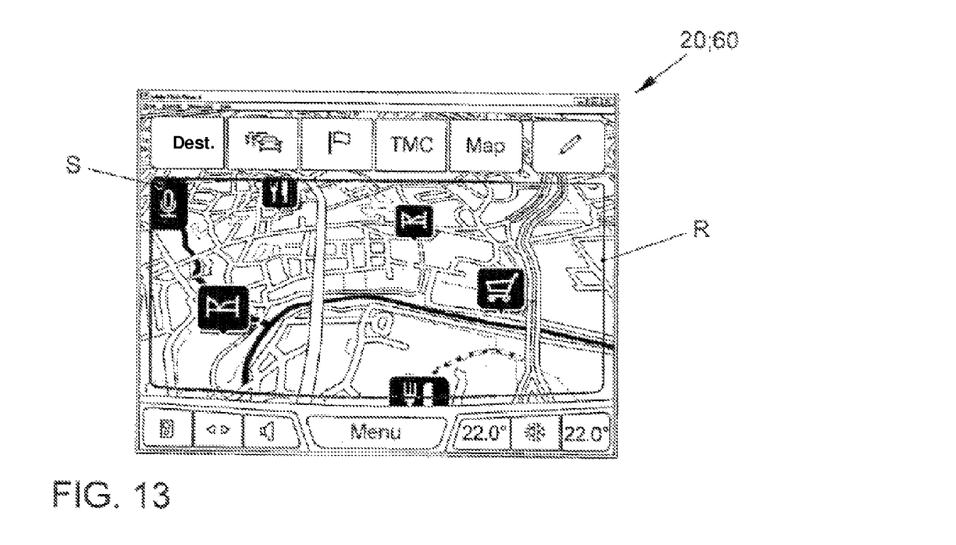
FIG. 13 shows the graphic dialog for the status display of the voice recognition means at the selected interaction object using the example of a POI selection on a navigation display.

FIG. 13 shows the graphic dialog and the "graphic feedback", respectively, for the status display of the voice recognition means at the selected interaction object using the example of a POI category selection on a navigation display. Illustrated in FIG. 13 is this solution on the basis of a navigation display which has been invoked in the display and operating element 20, 60. As an example different POI categories, such as "hotels" or "restaurants" or "shopping opportunities", are displayed on the navigation display in a basic view in which they are not yet surrounded by a frame R and the voice recognition means symbol S is not yet displayed. By means of a "long press touch" onto the display and operating element 20, 60 the start of the voice recognition means is carried out—for example again in combination with a haptic and/or acoustic feedback—as described above in principle. Emanating from a lower right corner the frame R has at first closed in the upper left corner and the voice recognition means symbol S appears. Therefore, a graphic feedback is provided to the user by means of which he may recognize exactly when the voice recognition means is active and he may carry out the voice input M3.

In consideration of the first and second embodiment, respectively, the voice input M3 is carried out with a restricted vocabulary provided for the interaction with the selected region. In FIG. 13, for example, the user has entered the category "hotel" via voice input. The display of the selected POI is carried out in the already mentioned manner such that the selected POI is highlighted and—as illustrated in FIG. 14—automatically moves further into the central field of vision of the user 10.

Subsequently, disintegrating the frame R, the border (as illustrated in FIG. 11), emanating from the position at which the frame R initially was formed, moves back in the direction of the voice recognition means symbol S and upon arriving at the voice recognition means becomes inactive and the symbol S associated therewith is again faded out.

Figure 14:
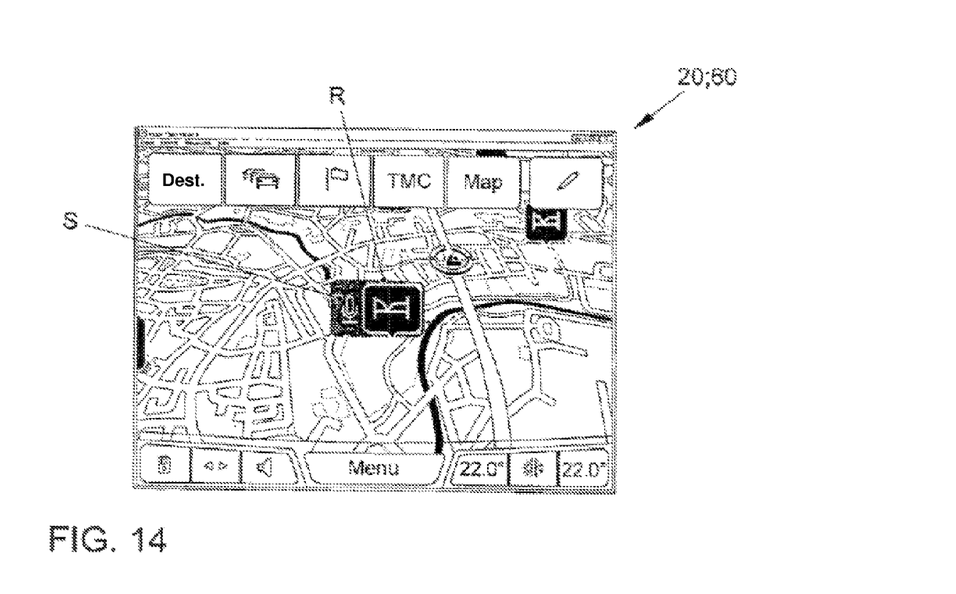
FIG. 14 shows the graphic dialog for the status display of the voice recognition means at the selected interaction object using the example of a single POI on a navigation display.

Described in FIG. 14 is the graphic dialog for the status display of the voice recognition means at the selected interaction object using the example of the individual POI of FIG. 13 selected by means of a voice dialog on a navigation display. If the user 10 wishes to receive information related to the selected hotel, to contact the hotel using the voice dialog system or to interact in another manner he again proceeds as follows. A "long press touch" onto the POI as the object itself is carried out. According to the embodiments described alternatively or available in combination he again receives a haptic and/or acoustic feedback which signals that the input for starting the voice recognition means was successful. As an example emanating from the center at the right border of the POI object itself the circumferential border R closes in the center of the left border R.

The frame R such forming and the voice recognition means symbol S appear. The voice recognition means is active. In consideration of the first and second embodiment, respectively, the voice input M3 is carried out using a restricted vocabulary provided for the interaction with the selected object. As an example, the user voices the voice command M3 "drive there", whereby the hotel is transferred into the route planning of the navigation system as the destination. Or he expresses the voice command M3 "call", whereupon automatically a telephone connection is set up to the hotel. Subsequently again the frame R is released, wherein the frame R is preferably emanating from the center of the right border of the object and the frame R again disappears by means of a band moving both-way in the direction of the voice recognition means symbol S disintegrating the frame R. The voice recognition means symbol S is faded out again and the voice recognition means is again inactive.

REFERENCE NUMERALS 10 user
20 detecting display and control device
60 outputting display and control device M input signal
M1 first modality [touch control action]
M2 second modality [gesture control action]
M3 third modality [voice]
d distance
S voice recognition means symbol
R frame/border

What is claimed is:

1. A method for multimode information input for a touchscreen device in a motor vehicle, the method comprising:
   detecting, by the touchscreen device, an input motion of a user, the input motion comprising a physical gesture of the user that is (a) a contactless physical gesture with respect to a surface of the touchscreen device or (b) a touching of the surface of the touchscreen device,
   automatically activating a voice recognition means associated with the touchscreen device in response to a detection of the input motion performed during the input motion and prior to completion of the input motion, and
   after the activation of the voice recognition means and after completion of the input motion, determining, by the touchscreen device, a selection of one or more objects that are displayed by the touchscreen device, wherein the determination is based on an evaluation of the completed input motion,
   in response to the one or more displayed objects or in response to the activation of the voice recognition means, automatically implementing a restriction of a vocabulary, which vocabulary is provided for interaction, wherein the restriction is based on the selected one or more displayed objects,
   receiving, by the voice recognition means, a voice command associated with the selected one or more displayed objects and defined by the restricted vocabulary, wherein the voice recognition means is configured to receive the voice command as an information input or for adapting a display of the touchscreen device.

2. The method according to claim 1, wherein the input motion of the user comprises at least one of a long press touch, a double click touch, a two-finger touch, or a drag gesture.

3. The method according to claim 1, comprising providing the displayed one or more objects only after automatically activating the voice recognition means.

4. The method according to claim 1, wherein the voice recognition means is active only for a presettable, defined period of time after being activated, which defined period of time limits when the voice command is receivable from the user.

5. The method according to claim 1, wherein the received voice command is (a) a single word or (b) a vocable comprising multiple words.

6. The method according to claim 1, comprising superimposing on the display a text image that corresponds to the received voice command, wherein the text image that corresponds to the received voice command is superimposed on the display for a presettable, defined period of time.

7. The method according to claim 1, comprising, in response to receiving a voice command which does not match the one or more selected objects, providing at least one of a graphic display or an acoustic display indicating that the voice command does not match the one or more selected objects.

8. The method according to claim 1, wherein the touchscreen device comprises one or more proximity sensors, and wherein the detection of the input motion of the user comprises contactless detection of the physical gesture by the one or more proximity sensors.

9. A multimode information input system configured to receive multimode interactions of a user, the multimode information input system comprising:
   a processor; and
   logic instructions stored in non-transitory computer-readable media and executable by the processor to:
      detect an input motion at a touchscreen device, the input motion comprising a physical gesture of a user that is (a) a contactless physical gesture relative to a surface of the touchscreen device or (b) a user touching of the surface of the touchscreen device,
      automatically activate a voice recognition means associated with the touchscreen device in response to a detection of the input motion performed during the input motion and prior to completion of the input motion, and
      after the activation of the voice recognition means and after completion of the input motion, determine a selection of one or more objects that are displayed at the touchscreen device, wherein the determination is based on an evaluation of the completed input motion,
      in response to the selection of the one or more displayed objects or in response to the activation of the voice recognition means, automatically implement a restriction of a vocabulary, which vocabulary is provided for interaction, wherein the restriction is based on the selected one or more displayed objects,
      receive, by the voice recognition means, a voice command associated with the selected one or more displayed objects and defined by the restricted vocabulary, wherein the voice recognition means is configured to receive the voice command as an information input or for adapting a display of the touchscreen device.

10. The multimode information system according to claim 9, wherein depending on the detected input motion from the user, the logic instructions are executable to generate control signals for a system selected from the group consisting of:
    a navigation system comprising system functions selected from the group consisting of: route planning, correction of at least one of start and destination inputs, point of interest search, point of interest selection, point of interest interaction, and communications functions, and
    an entertainment system comprising system functions related to a selection and a correction of music titles.

11. The multimode information system according to claim 9, wherein the touchscreen device comprises one or more proximity sensors, and wherein detection of the input motion of the user comprises contactless detection of the physical gesture by the one or more proximity sensors.

* * * * *